United States Patent Office 2,864,738
Patented Dec. 16, 1958

2,864,738

FUNGICIDAL COMPOSITIONS COMPRISING SULFURIZED MERCAPTOLS

Carleton B. Scott, Pomona, Calif., assignor, by mesne assignments, to Collier Carbon and Chemical Corporation, a corporation of California No Drawing. Application April 22, 1957
Serial No. 654,075

15 Claims. (Cl. 167—22)

This invention relates to novel compositions of matter useful as fungicides, and in particular concerns fungicidal compositions in which the essential active ingredient is a product obtained by reacting a dimethyl dialkyl ketone mercaptol with elemental sulfur.

As is well known, the dimethyl dialkyl ketone mercaptols are formed by reaction between methyl mercaptan and a dialkyl ketone in accordance with the equation:

wherein R and R" each represents an alkyl radical. The reaction takes place readily at moderately elevated temperatures in the presence of an acidic catalyst, such as hydrogen chloride or zinc chloride, and a wide variety of dimethyl dialkyl mercaptols are known and have been prepared in such manner. The nomenclature of such mercaptols is derived from the ketones from which they are formed. Thus, the mercaptol obtained from methyl mercaptan and acetone is termed "dimethyl acetone mercaptol" and that obtained from methyl mercaptan and di-isobutyl ketone is termed "dimethyl di-isobutyl ketone mercaptol."

The present invention is based on my discovery that while the dimethyl dialkyl ketone mercaptols themselves have very little fungicidal activity, the reaction products of such mercaptols with elemental sulfur are highly toxic to a variety of fungi and may be advantageously employed as the essential active ingredient in fungicidal compositions of more or less conventional formulation. As is hereinafter more fully pointed out, the sulfurization reaction can be controlled so as to produce sulfurized mercaptol products containing from one to an average of about ten atoms of sulfur per molecule of the mercaptol. Any of such sulfurized products may be employed in the formulation of fungicidal compositions and in the control of fungi in accordance with the invention.

The mercaptols which are reacted with sulfur to form the present class of fungitoxic agents are dimethyl dialkyl ketone mercaptols having the general formula:

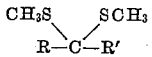

wherein R and R' each represents an alkyl group containing from 1 to about 22 carbon atoms. Examples of such mercaptols are dimethyl acetone mercaptol, dimethyl methyl iso-amyl ketone mercaptol, dimethyl di-n-hexyl ketone mercaptol, dimethyl 2-undecanone mercaptol, dimethyl 3-tetradecanone mercaptol, dimethyl ethyl cetyl ketone mercaptol, dimethyl dilauryl ketone mercaptol, etc. Mixtures of such mercaptols, obtained by reacting methyl mercaptan with mixtures of dialkyl ketones (for example, those obtained by the Oxo reaction) may also be employed.

The sulfurization reaction takes place readily upon heating a mixture of the two reactants at moderately elevated temperatures under atmospheric or elevated pressures. Preferably, the reaction is carried out in a closed vessel under autogenic pressure. The reaction temperature should be sufficiently elevated to effect chemical reaction between the two reactants rather than mere solution of one in the other. If a mixture of elemental sulfur and one or a mixture of dimethyl dialkyl mercaptols is gradually heated it will be observed that at a relatively low temperature, e. g. 70° C., the sulfur dissolves and the mixture becomes a single liquid phase. However, if the heating be stopped at this point and the mixture is allowed to cool to about 20° C., the free fulfur crystallizes out of solution, thus indicating that mere physical solution rather than chemical reaction has occurred. On the other hand, if the heating is continued and the temperature is allowed to increase to about 150° C. and allowed to remain there for a suitable length of time, substantially no free sulfur crystallizes upon subsequent cooling, thereby indicating that true chemical reaction has occurred. The temperature at which such chemical reaction occurs depends to some extent upon the identity of the mercaptol reactant, but it is usually at least about 100° C. In practice, it is preferred to operate at temperatures between about 125° C. and about 250° C. The time required for completion of the reaction depends upon the reaction temperature and the proportions in which the two reactants are employed, but is usually between about 0.5 and about 12 hours, with the longer periods within this range being employed when the reaction temperature is relatively low and/or the proportion of sulfur to mercaptol is relatively high. As a general rule, heating the two reactants at a temperature between about 125° C. and about 200° C. for a period of time between about 1 and about 6 hours will lead to optimum results. If desired, the reaction may be promoted by carrying it out in the presence of a small amount of a metal salt Lewis acid, e. g., zinc chloride.

As stated, from one to an average of about ten atoms of sulfur can be introduced into the dimethyl dialkyl ketone mercaptol molecule. Accordingly, in preparing the present fungicidal agents as described above, from one to about ten atomic weights of sulfur may be provided per molecular weight of the mercaptol. If desired, an excess of sulfur may be provided and the unreacted excess separated from the sulfurized product upon completion of the reaction. The physical and biological properties of the sulfurized products vary somewhat with the amount of sulfur contained therein, and insofar as fungicidal activity and ease of formulating into simple fungicidal compositions are concerned it is preferred to employ the products containing an average of from about two to about six atoms of sulfur per molecule of the mercaptol.

Procedurewise, the reaction is carried out simply by charging the desired amounts of the two reactants into a reaction vessel and heating the mixture under the conditions previously described. If desired, the reactions may be carried out in the presence of an inert liquid reaction medium, e. g., benzene, toluene, carbon tetrachloride, etc., which is subsequently either removed from the finished product by distillation or allowed to remain therewith to serve as a dispersing aid in formulating fungicidal compositions. Ordinarily, however, it is preferred to dispense with the use of reaction media, and to effect the reaction by heating a simple mixture of the two reactants. Upon completion of the reaction the product can be used directly and without further purification in formulating fungicidal compositions. If desired, however, the product may be gas-stripped to remove volatile by-products and/or distilled into fractions containing varying amounts of combined sulfur.

To summarize the foregoing, the fungicidal products employed in practicing the invention are sulfurized mercaptols obtained by reacting elemental sulfur with one or a mixture of dimethyl dialkyl ketone mercaptols of the present class at a temperature between about 100° C. and about 250° C. for a period of time between about 0.5 and about 12 hours, at least one atomic weight of sulfur being employed per molecular weight of said mercaptol and said conditions of time and temperature being sufficient to effect the formation of a sulfurized mercaptol product contatining from one to an average of about ten atoms of sulfur per molecule of said mercaptol.

The following examples will illustrate the preparation of several of the present class of fungicidal agents, but are not to be construed as limiting the invention. All proportions are stated in parts by weight.

*Example I*

A mixture of 124 parts (1 molecular weight) of dimethyl acetone mercaptol and 32 parts of sulfur (1 atomic weight) of sulfur were charged to a rocking autoclave and heated at 150° C. for 5 hours under autogenic pressure. The reaction product was then cooled in an ice bath. The lack of precipitation of free sulfur indicated that complete reaction had been obtained. The reaction product was then stripped with dry nitrogen at room temperature under 1.0 mm. pressure for 1 hour to remove volatile by-products. Analysis of the resulting product indicated it to be dimethyl acetone mercaptan monosulfide having the empirical formula $C_5H_{12}S_3$. The disulfide, trisulfide, tetrasulfide and pentasulfide of dimethyl acetone mercaptol were obtained by operating in the same manner with appropriately larger amounts of free sulfur. In no case was any unreacted sulfur obtained by cooling the reaction product to ice-bath temperatures.

*Example II*

A mixture of 62 parts (0.25 molecular weight) of dimethyl 2-undecanone mercaptol (B. P.=125°–127° C./0.5 min.), 16 parts (0.5 atomic weight) of elemental sulfur, and 0.8 part of zinc chloride was heated at 107°–149° C. for 40 minutes. No sulfur precipitated upon cooling the reaction product to ice-bath temperature, whereupon the product was stripped with nitrogen for 1 hour at room temperature and 1.0 mm. pressure to obtain dimethyl 2-undecanone mercaptol disulfide in substantially pure form. The corresponding trisulfide was prepared by increasing the amount of sulfur to 24 parts (0.75 atomic weight) and effecting the reaction at 116°–151° C. for 40 minutes.

*Example III*

Dimethyl octanone mercaptol disulfide was prepared by reacting 51 parts of dimethyl octanone mercaptol (B. P.=81°–85° C./0.2 mm.) with 16 parts of sulfur and 0.8 part of zinc chloride at 105°–151° C. for 40 minutes, and then cooling and gas-stripping the reaction product as described in the preceding examples. The tetrasulfide was prepared by increasing the amount of sulfur to 32 parts.

*Example IV*

Dimethyl methyl isobutyl ketone mercaptol disulfide was prepared by heating 89 parts of the mercaptol (B. P.=51°–61° C./0.4 mm.) with 32 parts of sulfur in the presence of 1.2 parts of zinc chloride at 106°–150° C. for 1 hour, followed by cooling and gas-stripping as described above. The trisulfide was obtained by increasing the amount of sulfur to 48 parts.

The fungicidal compositions provided by the present invention essentially comprise one or a mixture of the aforesaid sulfurized dimethyl dialkyl mercaptols and an inert pesticidal carrier material which may be either liquid or solid. When the composition is to take the form of a liquid spray or dip, the inert carrier material is usually water and the active ingredient is maintained dispersed or suspended therein with the aid of an organic dispersing agent. Alternatively, the sulfurized mercaptol may be mixed with an inert solid carrier material such as talc, diatomaceous earth, aluminum silicate, etc. to form dry compositions which can be employed as such in the form of dusts or which can be dispersed in an aqueous or oleaginous medium to form a liquid spray. In general, any of the conventional formulation and application techniques may be followed in employing the present compositions, and any of the known wetting agents, spreaders, sticking agents, diluents, etc. may be employed in combination with such products.

The sulfurized mercaptol toxicants of the present class are effective in relatively small quantities, and in the interests of economy they are usually applied at concentrations of the order of 50–4000 parts per million. Liquid concentrate compositions usually contain between about 1 and about 15 percent by weight of the active ingredient and sufficient of an emulsifying or dispersing agent to maintain the active ingredient uniformly dispersed in the liquid suspending medium. Solid concentrate compositions usually contain between about 5 and about 50 percent by weight of the active ingredient, and, optionally, small amounts of spreading agents, dispersing agents, and other conventional adjuvants.

The following examples will illustrate the formulation of a number of fungicidal compositions within the scope of the invention, but are not to be construed as limiting the same:

*Example V*

| | Lbs. |
|---|---|
| Dimethyl methyl hexyl mercaptol trisulfide | 2.0 |
| Attapulgus clay | 2.5 |
| Aluminum silicate | 40.0 |
| Powdered blood albumen | 0.2 |

The ingredients are thoroughly admixed in a ball mill to obtain a fungicidal dusting composition.

*Example VI*

| | Lbs. |
|---|---|
| Dimethyl di-isobutyl mercaptol pentasulfide | 2.5 |
| Water | 50.0 |
| Powdered blood albumen | 0.25 |

The sulfurized mercaptol and blood albumen are added to the water, and the mixture is then passed through a colloid mill or high speed blender to obtain a concentrate composition which can be diluted 1000:1 to obtain a fungicidal spray.

*Example VII*

| | Lbs. |
|---|---|
| Dimethyl acetone mercaptol octasulfide | 0.5 |
| Benzene | 5.0 |
| Non-phytotoxic spray oil | 4000.0 |

This composition is useful as a tree spray.

*Example VIII*

| | Lbs. |
|---|---|
| Dimethyl methyl ethyl ketone mercaptol monosulfide | 10.0 |
| Kerosene extract oil | 150.0 |

This composition is useful for impregnating lumber.

*Example IX*

| | Lbs. |
|---|---|
| Dimethyl 2-decanone disulfide | 2.5 |
| Water | 50.0 |
| Commercial sticking agent | 0.5 |
| Commercial spreading agent | 0.5 |

The ingredients are admixed in a colloid mill and are thereafter diluted with 1250 gallons of water to obtain a spray composition containing about 250 parts per million of the active ingredients.

Example X

| | Lbs. |
|---|---|
| Dimethyl methyl cetyl ketone mercaptol hexasulfide | 0.5 |
| Non-ionic dispersing agent | 0.2 |
| Water | 500.0 |

Example XI

| | Lbs. |
|---|---|
| Dimethyl 3-heptanone mercaptol trisulfide | 2.0 |
| Walnut shell flour | 40.0 |
| Petroleum sulfonates | 0.3 |

The ingredients are thoroughly mixed in a ball mill to obtain a dry concentrate composition which can subsequently be dispersed in water to form a spray.

In order to demonstate the fungicidal activity of the present products, the following procedure is employed: The material to be tested is formulated into a wettable powder by grinding together and intimately admixing the following ingredients:

| | Pts. by weight |
|---|---|
| Test material | 10.0 |
| Attalpulgus clay | 30.0 |
| "Neoterge" wetting agent | 0.12 |
| "Dupanol ME" wetting agent | 0.05 |
| Lignin sulfate suspending agent | 0.12 |

A 10-gram sample of the composition is added to enough distilled water to make 100 grams, and the solution is homogenized for three minutes in a high-speed blender. With the blender still operating, 3 grams of the liquid are removed therefrom and stirred into 75 grams of liquid potato dextrose agar at 45° C. and the agar is transferred to a Petri-dish. The agar so prepared contains 1000 p. p. m. of the material to be tested. If lower concentrations are to be tested, e. g., 10 or 100 p. p. m., 1-gram portions of the concentrate composition in the blender are diluted accordingly. The agar is allowed to cool and solidify, and a ¼" disc of the test fungus inoculum is placed on the surface of the agar. The inoculated agar is incubated for two days, after which the extent of the fungus growth is measured and the extent of inhibition of fungus growth is calculated as follows:

$$\text{Percent inhibition} = 100 - \frac{\text{growth on test sample}}{\text{growth on blank}} \times 100$$

The following tabulation presents inhibition values obtained by subjecting several of the present products to the foregoing test procedure employing a variety of test organisms. All tests were carried out with an active ingredient concentration of 100 p. p. m.

trol of *Rhizoctonia solani* on cotton plants; the test material was employed at a concentration of 200 p. p. m.

| Product tested: | Percent control |
|---|---|
| Dimethyl acetone mercaptol | 0 |
| Dimethyl acetone mercaptol disulfide | 71 |
| Dimethyl acetone mercaptol trisulfide | 81 |
| Dimethyl acetone mercaptol pentasulfide | 95 |

In addition to the foregoing, dimethyl acetone mercaptol trisulfide and pentasulfide provided 95% and 100% control, respectively, of *Pythium ultimum* on pea plants, and dimethyl octanone mercaptol trisulfide and tetrasulfide, dimethyl methyl isobutyl ketone mercaptol trisulfide, and dimethyl 2-undecanone mercaptol disulfide and trisulfide all proved effective in controlling *Alternaria solani* on tomato plants. Certain of the present products were further found to show promise as nematocides.

Other modes of applying the principle of my invention may be employed instead of those explained, change being made as regards the methods or materials employed, provided the products or steps stated by any of the following claims, or the equivalent of such stated products or steps, be obtained or employed.

I, therefore, particularly point out and distinctly claim as my invention:

1. A fungicidal composition comprising an inert fungicidal carrier material and, as the essential fungitoxic ingredient, a sulfurized mercaptol obtained by heating a dimethyl dialkyl ketone mercaptol of the formula:

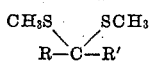

wherein R and R' each represents an alkyl radical, with elemental sulfur at a temperature between about 100° C. and about 250° C. for a period of time between about 0.5 and about 12 hours, between about one and about ten atomic weights of sulfur being employed per molecular weight of said dimethyl dialkyl ketone mercaptol and said conditions of time and temperature being sufficient to effect the formation of a sulfurized mercaptol product containing from one to an average of ten atoms of sulfur per molecule of said dimethyl dialkyl ketone mercaptol.

2. A composition as defined by claim 1 wherein the said carrier material comprises a particulate inorganic solid.

3. A composition as defined by claim 1 wherein the said carrier material comprises water and sufficient of a dispersing agent to maintain said fungitoxic ingredient uniformly dispersed in said water.

4. A composition as defined by claim 1 wherein said

| Product Tested | Percent Inhibition | | | | | |
|---|---|---|---|---|---|---|
| | R. solani | F. roseum | P. ultimum | S. sclerotiorum | B. cinerea | A. solani |
| Dimethyl acetone mercaptol | 0 | | 21.5 | 23.5 | 14.6 | 0 |
| Dimethyl acetone mercaptol monosulfide | 81.4 | 74.4 | 100 | 100 | 97.4 | 93.3 |
| Dimethyl acetone mercaptol disulfide | 83.7 | 80.0 | 100 | 100 | 100 | 86.7 |
| Dimethyl acetone mercaptol trisulfide | 79.2 | 66.6 | 100 | 100 | 100 | 80.0 |
| Dimethyl acetone mercaptol tetrasulfide | 86.1 | 66.6 | 100 | 100 | 93.1 | 93.3 |
| Dimethyl acetone mercaptol pentasulfide | 77.6 | 66.6 | 100 | 100 | 90.9 | 93.3 |
| Dimethyl 2-undecanone mercaptol | 22.5 | 21.1 | 33.7 | 27.7 | 28.1 | 25.0 |
| Dimethyl 2-undecanone mercaptol disulfide | | | 100 | 86.6 | | |
| Dimethyl 2-undecanone mercaptol trisulfide | | | 100 | 91.4 | | |
| Dimethyl octanone mercaptol | 32.3 | 15.8 | 22.1 | 31.8 | 20.0 | 15.6 |
| Dimethyl octanone mercaptol disulfide | | | 100 | 96.2 | | 75.0 |
| Dimethyl octanone mercaptol tetrasulfide | | | | 100 | 100 | |
| Dimethyl methyl isobutyl ketone mercaptol | 9.6 | 21.1 | 11.6 | 27.3 | 23.0 | 21.8 |
| Dimethyl methyl isobutyl ketone mercaptol disulfide | 75.5 | | 100 | 100 | | |
| Dimethyl methyl isobutyl ketone mercaptol trisulfide | | | 100 | 100 | | 100 |

The following results were obtained by subjecting typical representative members of the present class of sulfurized mercaptols to standard greenhouse tests for consulfurized mercaptol contains an average of from about two to about six atoms of sulfur per molecule of said dimethyl dialkyl ketone mercaptol.

5. A composition as defined by claim 1 wherein said dimethyl dialkyl ketone mercaptol is dimethyl acetone mercaptol.

6. A composition as defined by claim 1 wherein said dimethyl dialkyl ketone mercaptol is dimethyl 2-undecanone mercaptol.

7. A composition as defined by claim 1 wherein said dimethyl dialkyl ketone mercaptol is dimethyl octanone mercaptol.

8. A composition as defined by claim 1 wherein said dimethyl dialkyl ketone mercaptol is dimethyl methyl isobutyl ketone mercaptol.

9. A fungicidal composition comprising an inert fungicidal carrier material and, as the essential active ingredient, a sulfurized mercaptol obtained by heating a dimethyl dialkyl ketone mercaptol of the formula:

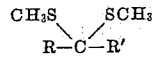

wherein R and R' each represents an alkyl radical, with elemental sulfur at a temperature betwen about 125° C. and about 200° C. for a period of time between about one and about six hours and under autogenic pressure and thereafter separating from the product so obtained any unreacted sulfur, between about two and about ten atomic weights of sulfur being employed per molecular weight of said dimethyl dialkyl ketone mercaptol and said conditions of time and temperature being sufficient to effect the formation of a sulfurized mercaptol product containing an average of from about two to about six atoms of sulfur per molecule of said dimethyl dialkyl ketone mercaptol.

10. A composition as defined by claim 9 wherein the said carrier material is a particulate inorganic solid.

11. A composition as defined by claim 9 wherein the said carrier material comprises water and sufficient of a dispersing agent to maintain said fungitoxic ingredient uniformly dispersed in said water.

12. A composition of matter adapted to being diluted with water to form a fungicide, said composition comprising water between about 1 and about 15 percent by weight of a sulfurized mercaptol obtained as defined in claim 9, and sufficient of a dispersing agent to maintain said sulfurized mercaptol uniformly dispersed in said water.

13. A composition of matter adapted to being dispersed in water to form a fungicide, said composition comprising an inert particulate inorganic fungicidal carrier material, between about 5 and about 50 percent by weight of a sulfurized mercaptol obtained as defined in claim 9, and sufficient of a dispersing agent to maintain said carrier material and said sulfurized mercaptol uniformly dispersed in said water.

14. The method of controlling the growth of fungi on plants which comprises applying thereto a fungicidal amount of a composition as defined by claim 1.

15. The method of controlling the growth of fungi on plants which comprises applying thereto a fungicidal amount of a composition as defined by claim 9.

No references cited.